(12) United States Patent
Lukic et al.

(10) Patent No.: US 12,722,281 B2
(45) Date of Patent: Sep. 1, 2026

(54) STORAGE SYSTEM AND CONSTRUCTION ROBOT HAVING A STORAGE SYSTEM

(71) Applicant: Hilti Aktiengesellschaft, Schaan (LI)

(72) Inventors: Sasha Lukic, Buchs (CH); Oemer Kuecue, Schaanwald (LI)

(73) Assignee: Hilti Aktiengesellschaft, Schaan (LI)

( * ) Notice: Subject to any disclaimer, the term of this patent is extended or adjusted under 35 U.S.C. 154(b) by 186 days.

(21) Appl. No.: 18/697,598

(22) PCT Filed: Nov. 9, 2022

(86) PCT No.: PCT/EP2022/081296
§ 371 (c)(1),
(2) Date: Apr. 1, 2024

(87) PCT Pub. No.: WO2023/088752
PCT Pub. Date: May 25, 2023

(65) Prior Publication Data

US 2024/0408743 A1 Dec. 12, 2024

(30) Foreign Application Priority Data

Nov. 22, 2021 (EP) .................................... 21209489

(51) Int. Cl.
*B25J 11/00* (2006.01)
*B25J 9/00* (2006.01)

(52) U.S. Cl.
CPC ............. *B25J 9/0009* (2013.01); *B25J 11/00* (2013.01)

(58) Field of Classification Search
CPC ....... B25J 11/00; B25J 15/0491; B25J 9/0009
See application file for complete search history.

(56) References Cited

U.S. PATENT DOCUMENTS 11,668,331 B2 * 6/2023 Brucksch ............... B25J 9/0096 29/428
11,738,934 B2 * 8/2023 Jain ........................ B65D 25/38 700/246
2009/0021124 A1 1/2009 Klassen et al.
2009/0307891 A1 * 12/2009 Offer .................... G21C 17/017 228/103

(Continued)

FOREIGN PATENT DOCUMENTS

| | | | |
|---|---|---|---|
| CN | 202742116 | U | 2/2013 |
| CN | 103072034 | B | 1/2016 |
| DE | 20 2007 016 098 | U1 | 4/2009 |
| DE | 20 2010 001 559 | U1 | 5/2010 |
| EP | 1 753 928 | A0 | 2/2007 |
| EP | 3 098 025 | A1 | 11/2016 |

(Continued)

OTHER PUBLICATIONS

Truong et al., Development and optimization of automated storage and retrieval algorithm in warehouse by combining storage location identification and route planning method, 2017, IEEE, p. 600-6605 (Year: 2017).*

(Continued)

*Primary Examiner* — Mcdieunel Marc
(74) *Attorney, Agent, or Firm* — Leydig, Voit & Mayer, Ltd.

(57) ABSTRACT

A storage system having at least one storage location is provided. The storage location has a protective cover for protection against entering and/or escaping particles, liquids and/or gases, and a storage space, wherein the protective cover is arranged pivotably at the storage location. A construction robot having such a storage system is also provided.

12 Claims, 3 Drawing Sheets

(56) References Cited

U.S. PATENT DOCUMENTS

| | | | | |
|---|---|---|---|---|
| 2015/0298343 | A1* | 10/2015 | Jung | B26F 3/008 83/34 |
| 2018/0087303 | A1 | 3/2018 | Kohler et al. | |
| 2021/0016435 | A1* | 1/2021 | Ehleiter | B25J 19/0025 |
| 2021/0094192 | A1* | 4/2021 | Maurer | B25J 17/0241 |

FOREIGN PATENT DOCUMENTS

| | | |
|---|---|---|
| KR | 10-0828608 B1 | 5/2008 |

OTHER PUBLICATIONS

Ajol et al., An enhanced storage location assignment policy by minimizing handling cost for warehouse XYZ, 2015, IEEE, p. 408-412 (Year: 2015).*

Rao et al., A Mathematical Model for Optimal Partitions of Warehouse Storage Space Based on Turnover Density, 2011, IEEE, p. 133-137 (Year: 2011).*

Hao et al., A Data-Driven Storage Assignment Strategy for Automated Pharmacy, 2021, IEEE, p. 604-613 (Year: 2021).*

Yuan et al., A Design and Simulation of Aircraft Drilling End-effector Based on Bionics, 2012, IEEE, p. 206-211 (Year: 2012).*

Santos et al., A Service Robot for Construction Indus'i'ky, IEEE, 2010, IEEE, p. 441-446 (Year: 2010).*

European Patent Office, International Search Report and Written Opinion issued in International Patent Application No. PCT/EP2022/081296, mailed on Feb. 3, 2023.

Hilti North America, "How to operate the Hilti Jailbot—construction robot for overhead drilling applications", Retrieved from the Internet: https://www.youtube.com/watch?v=WYf-o8clijc (retrieved on May 11, 2022).

* cited by examiner

STORAGE SYSTEM AND CONSTRUCTION ROBOT HAVING A STORAGE SYSTEM

CROSS-REFERENCE TO RELATED APPLICATIONS

This patent application is the U.S. National Stage of International Patent Application No. PCT/EP2022/081296, filed Nov. 9, 2022, which claims the benefit of European Patent Application No. 21209489.0, filed Nov. 22, 2021, which are each incorporated by reference.

The invention is based on a storage system having at least one storage location, the storage location having a storage space and a protective cover.

The protective cover can cover the storage space. If the intention is to access the storage space of the storage location, the protective cover must first be removed. If, for example, a construction robot having a manipulator is to access the storage location, in particular the storage space, it must thus be set up to remove the protective cover.

It is therefore the object of the present invention to provide a storage system having at least one storage location having a storage space and a protective cover, and also a construction robot having such a storage system, which storage system and construction robot are constructed as simply as possible and provide reliable access to the storage location and in particular to the storage space.

The object is achieved by a storage system having at least one storage location, wherein the storage location has a protective cover, for example for protection against entering and/or escaping particles, liquids and/or gases, and a storage space, wherein the protective cover is arranged pivotably at the storage location.

The protective cover can in particular be pivotable laterally. The storage space can be accessible from above. For pivoting, the storage location can have a mechanical or electromechanical actuator, in particular which is equipped with a motor, or a hydraulic and/or a pneumatic actuator.

The storage location can have an actuator actuating element, for example in the form of a push button, a control lever of a switch and/or a control geometry, for activating and/or deactivating the actuator. The storage location can be set up in particular such that the protective cover is pivoted by actuation of the actuator actuating element.

A construction robot, for example having a manipulator, can thus approach the storage location from above, for example. The protective cover can be pivoted by the manipulator, in particular by actuation of the actuator actuating element.

The manipulator therefore does not need to access, for example, a location in the storage system outside the storage location. In particular, no second, independent manipulator or the like is required to actuate the actuator actuating element during access to the storage space. Costs can therefore be reduced. Incorrect actuations, for example because a second manipulator misses the actuator actuating element, can be avoided. The reliability with which the protective cover is pivoted for access to the storage space can thus be increased.

Each storage location can thus also be designed to be autonomous. The storage system can thus be constructed and/or constructable modularly. No or at least fewer connecting lines are required from, for example, a common location in the storage system to each individual storage location. The outlay on design and thus manufacturing costs can be reduced.

The storage location can have a control contour. The control contour can be set up such that, by following the control contour, the protective cover is pivotable from an initial position into a pivoted position. In particular, the actuator actuating element can be designed as a control contour and/or can comprise such a control contour.

By following the control contour, the storage space can thus be opened up. The control contour can be followed mechanically. For pivoting, a multiplicity of components and devices that would otherwise be required can be dispensed with. For example, an additional electromechanical, hydraulic and/or pneumatic actuator is not required. The protective cover can be pivoted in a purely mechanical manner. As a result, the reliability can be improved. In particular, the control of the pivoting does not require any electrical energy. Corresponding electrical supply lines can be dispensed with.

The protective cover can be set up to protect the storage space from impurities, for example, particles, such as dust or paint splatters, spray, undesirable gases, liquids and/or the like. It can be set up before such impurities enter and/or exit the storage space. The protective cover can be a protective panel. It can be pivotable horizontally and/or vertically. It can be mounted in such a way that the pivoted position is higher than the initial position.

If the storage location has a blocking element which is set up to fix the protective cover at least in the pivoted position, the protective cover can be held in the pivoted position, in particular after the control contour has been followed. Other regions of the storage location, for example the storage space, can then be freely accessible and/or freely accessed. For example, an object can be removed from and/or added to the storage space.

The blocking element can be a blocking pin and/or can comprise a blocking pin. For this purpose, the blocking element can have an elongate, for example cylindrical, shape and/or an element with an elongate shape.

The blocking element can have a latching mechanism. The latching mechanism can be set up such that the blocking element is releasably securable in an active state, in which it can fix the protective cover in the pivoted position, and/or in an inactive state, in which the protective cover is pivotable. The blocking element can thus be fixable at least in one of the states. The fixing can be switchable on and/or switchable off. For example, the blocking element can have a retracted state as an inactive state. As an active state, the blocking element can be in an extended state. If the blocking element is designed, for example, as a blocking pin, the active state can correspond to a state of the blocking element in which the blocking element protrudes from its surroundings.

The protective cover and the control contour can be mounted rotatably on a common threaded spindle which has a thread. The protective cover can thus move with the control contour. If, by following the control contour, the control contour is rotated, the protective cover can thus also be rotated and therefore pivoted, in particular pivoted as far as the pivoted position.

The protective cover, in particular its center of gravity, can be higher in the pivoted position than in the initial position. Thus, when released, the protective cover can pivot back into the initial position, driven by gravity and in particular automatically.

Alternatively or additionally, the storage location can also have a return spring element. The return spring element can be set up to be tensioned when the protective cover is pivoted from the initial position into the pivoted position. It can also be set up to move the released protective cover back from the pivoted position to the initial position, driven by spring force.

To assist a return of the protective cover driven by gravity, the control contour can have a pitch which is greater than or equal to a pitch of the thread of the threaded spindle.

It is also conceivable for the storage location to have an actuating element. The actuating element can be set up to activate and/or deactivate a clamping device of the storage space when actuated. The clamping device can be set up, for example, to hold an object, for example a consumable and/or a tool. In particular, it can be set up for releasably fixing the object at and/or in the storage space. The clamping device can then be releasable by actuation of the actuating element. After actuation of the actuating element, the object, for example the consumable or the tool, can be removed from the storage space. It is also conceivable to add such an object to the storage space when the actuating element is actuated.

The storage system can be set up to receive an object, such as, for example, a consumable, a tool for an electric power tool and/or an electric power tool. In general, the storage system can be set up to store at least one object, such as is usually used on a construction site. The consumable can be at least one anchor, for example a screw anchor, at least one nail and/or the like.

The tool and/or the power tool can be set up, for example, for drilling, cutting-off, in particular sawing, cutting and/or chiseling, for surface treatment, for example for grinding and/or for pressing. The tool can therefore be, for example, a drilling tool, a chiseling tool, a cutting tool, a grinding tool or the like.

The scope of the invention also covers a construction robot having such a storage system. The storage system can be arranged on the construction robot. Alternatively, it can also be placed separately from the construction robot. In particular, a system can be formed from a construction robot and a storage system.

A construction robot can be used with particular versatility if it is equipped with such a storage system.

The construction robot can have a manipulator. The manipulator can then access the storage system, in particular the at least one storage location, with its manipulator. For example, the construction robot can use its manipulator and/or an end effector of the manipulator to deposit a tool at the storage space and/or pick it up from there. Alternatively or additionally, it is also conceivable for the construction robot to deposit a power tool at the storage space and/or pick it up from there. Alternatively or additionally, it is also conceivable for the construction robot to deposit a consumable at the storage location and/or to pick it up from there. The consumable can then be processed, for example, on a ceiling and/or a wall of the construction site. In this way, the degree of autonomy of the construction robot can be significantly increased. In particular, the amount of manual interventions required for performing construction work can be reduced.

The construction robot may be formed for performing construction work on a building construction site and/or a civil engineering construction site. It may be set up for performing construction work on a ceiling, a wall and/or a floor. It may be formed for drilling, cutting-off, chiseling, grinding and/or setting a structural element. It may have one or more power tools. In particular, the power tool may be exchangeably arranged and/or formed. The power tool may be an electrical power tool. The power tool may have a tool.

The end effector may comprise the power tool and/or the tool. For example, the end effector may have an electrical power tool. The electrical power tool may comprise a construction tool, a cutting-off tool, a grinding tool and/or a setting tool. It is also conceivable that the end effector and/or the power tool are formed for marking. For example, the end effector may have a paint spraying device.

The manipulator may be formed as a robot arm. The manipulator may also have a lifting device. The lifting device may increase the size of the overall volume that can be reached by the manipulator. The manipulator may have at least three degrees of freedom. In particular, it may have at least six degrees of freedom.

The construction robot may also have a mobile platform. The mobile platform may comprise a wheeled undercarriage and/or a track-chain undercarriage. The mobile platform may have at least two degrees of freedom. The construction robot may have altogether at least ten degrees of freedom.

The construction robot may have a controller. The controller may be formed as a computer unit. It may have a processor, a memory unit and/or a program code that can be executed by the processor. The processor may have one or more sub-processors. The program code may be set up for controlling the manipulator in such a way that the protective cover is pivoted from the initial position to the pivoted position and/or vice versa, in particular if the storage space is to be accessed.

A control projection may be formed on the end effector of the manipulator. The control projection may be set up to follow a control contour of the storage location of the storage system. For this purpose, the program code may be set up to move the control projection along the control contour.

The construction robot can thus pivot a protective cover of the storage location of the storage system by means of the control projection. In particular, it can open up or block access to the storage space of the storage location. For example, it can first pivot the protective cover into the pivoted position. It can remove an object from the storage location, for example a consumable, a tool and/or a power tool. The protective cover can then pivot back to its initial position, for example driven by gravity. The construction robot can then use the removed object, for example the consumable, the tool and/or the power tool, on the construction site.

The control projection can preferably have and/or be a control pin. The control pin can be set up to follow the control contour. For this purpose, in particular, its dimensions, its position and/or its position may be matched to the control contour.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combinations in variants of the invention.

BRIEF DESCRIPTION OF THE SEVERAL VIEWS OF THE DRAWING(S)

Exemplary embodiments of the invention are shown in the schematic drawing and explained in more detail in the following description, in which.

DETAILED DESCRIPTION OF THE INVENTION

In order to make it easier to understand the invention, the same reference signs are used in each case for identical or functionally corresponding elements in the following description of the figures.

Figure 1:
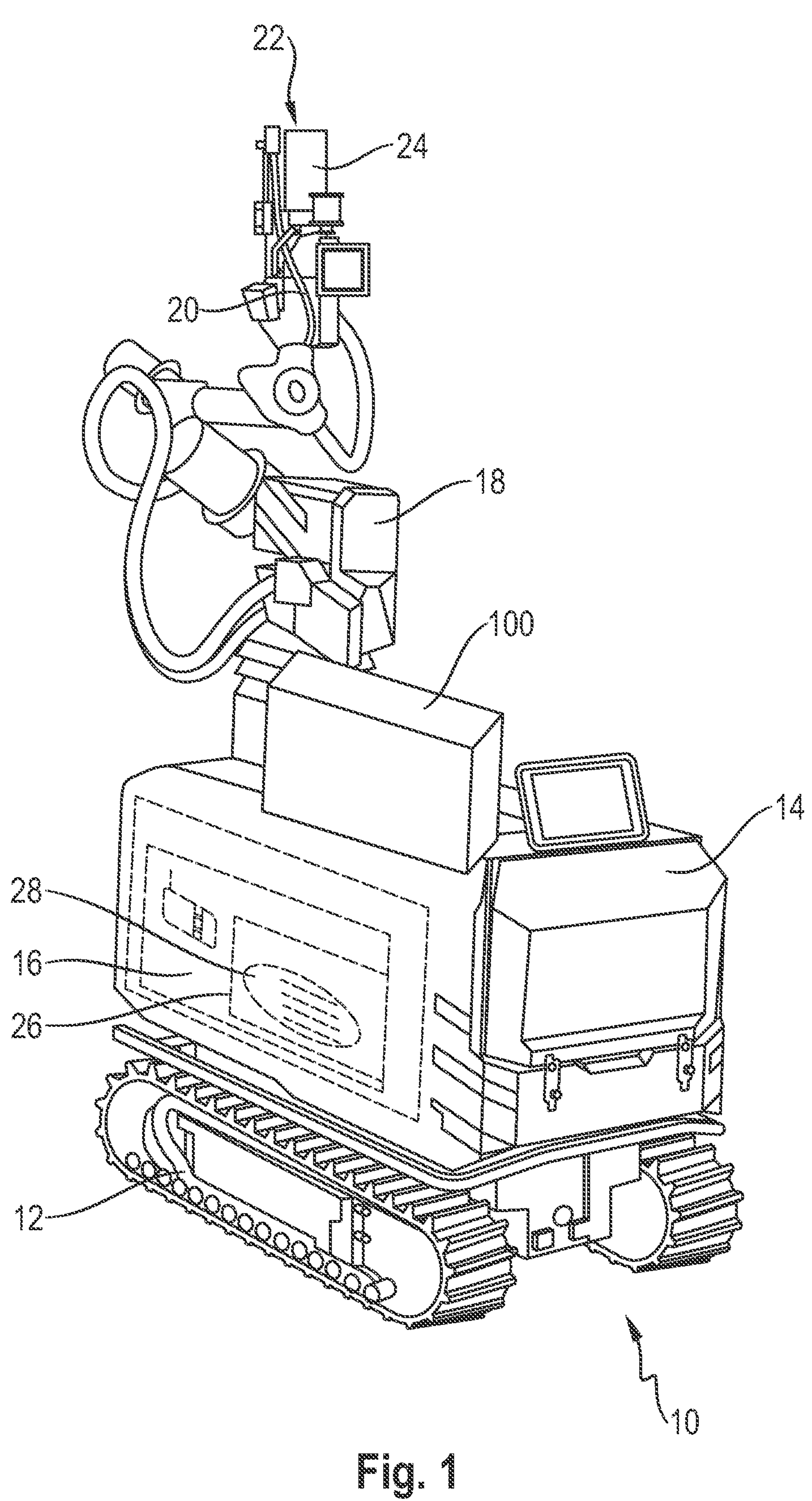
FIG. 1 shows a schematic illustration in a perspective view of a construction robot.

FIG. 1 shows a construction robot 10 with an undercarriage 12 designed as a track-chain undercarriage, a control space 16, formed in a housing 14, and a manipulator 18 arranged on top of the housing 14. The manipulator 18 is designed as a multi-axially controllable arm, at the free end of which an end effector 20 with a power drill 22 accommodated therein and a dust extraction device 24 is arranged.

The construction robot 10 is designed for performing construction tasks, for example drilling work in ceilings and walls, on a construction site, for example on a building construction site. In addition to the manipulator 18 for performing the construction tasks assigned to the construction robot 10, it has a computer unit 26 arranged within the housing 14, in particular in the control space 16. The computer unit 26 comprises a memory unit 28.

The computer unit 26 is equipped with executable program code; the program code can be stored in the memory unit 28 so as to be retrievable and executable. It can be set up to control the manipulator 18 such that, if necessary, an object can be picked up from the storage location, in particular from a storage space of the storage location, and/or deposited there.

The construction robot 10 also has a storage system 100, which is illustrated merely schematically in FIG. 1 and is explained in more detail with reference to the following figures.

Figure 2:
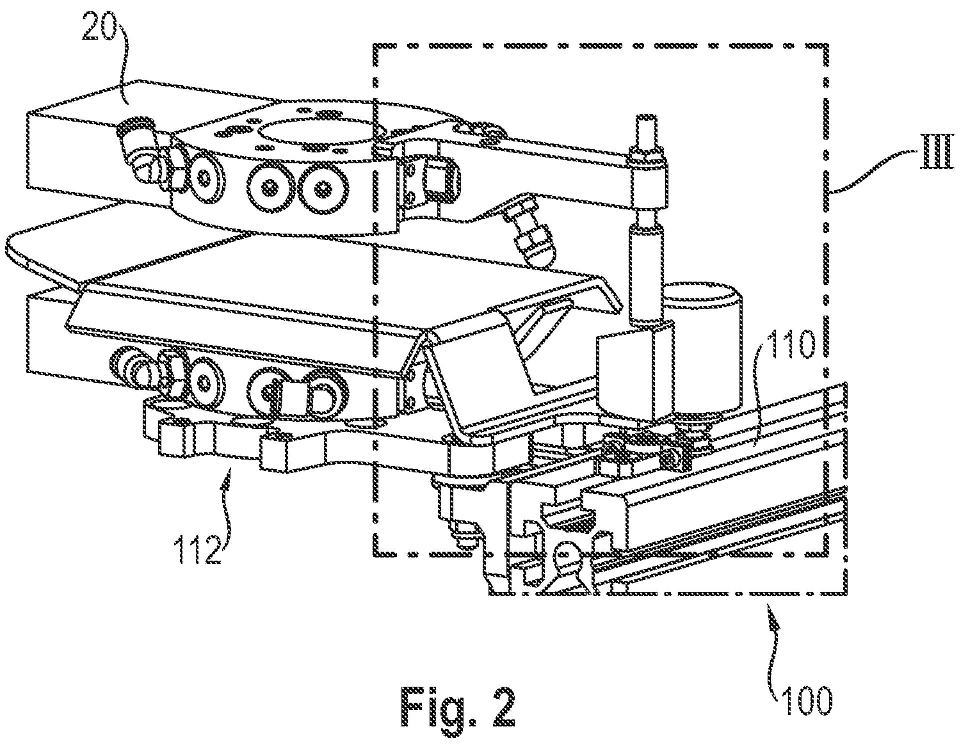
FIG. 2 shows a storage system in a perspective illustration.

FIG. 2 shows a detail of the storage system 100 in a perspective illustration. The storage system 100 is operated by the end effector 20 of the construction robot 10 (FIG. 1). The end effector 20 is illustrated schematically in FIG. 2. In the state according to FIG. 2, no power tool, in particular neither a power drill 22 nor a dust extraction device 24 (both FIG. 1), is accommodated therein, for example. It would be conceivable for the end effector 20 to approach the storage system 100 in order to pick up an object from there, for example a power tool, a tool and/or a consumable and/or to deposit it there.

The storage system 100 has a plurality of storage locations, in particular of identical design, which are arranged along a carrier rail 110 and of which a storage location 112 is depicted in the detail illustrated in FIG. 2. The additional storage locations can be arranged, for example, adjacent to the storage location 112 along the carrier rail 110.

A plurality of objects, in particular also objects of different types, can thus be stored in the various storage locations of the storage system 100. The end effector 20 can then select one of the storage locations as required and, for example, pick up an object deposited there and/or deposit same.

The carrier rail 110 may be designed as a profiled rod. Alternatively, it is conceivable to arrange a plurality of storage locations next to one another and/or one above another. For example, they may be mounted on a common base which is not necessarily in the form of a rail. Adjacent storage locations can also be directly connected to one another, for example screwed together.

Figure 3:
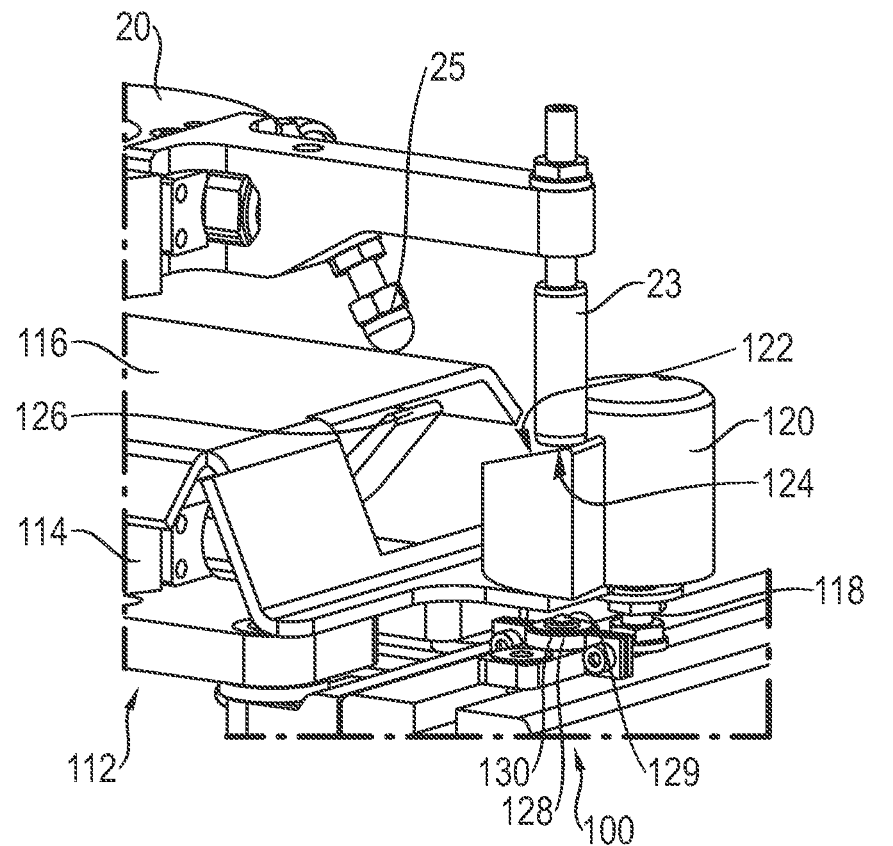
FIG. 3 shows a detail from FIG. 2 in an enlarged illustration.

FIG. 3 shows, in a perspective illustration, a detail III from FIG. 2 in an enlarged view.

The end effector 20 has a control projection 23. The control projection 23 is in the form of a control pin. The end effector 20 further has an actuating projection 25. The control projection 23 and/or the actuating projection 25 may be variable in length, in particular in order to be able to adjust them for correct functioning. For example, in the exemplary embodiment according to FIG. 3, a cap nut is arranged adjustably, in particular rotatably, on the actuating projection 25.

The storage location 112 has a storage space 114. The storage space 114 is covered, and thereby protected, by a protective cover 116 in the state illustrated in FIG. 2. The protective cover 116 can be pivoted to the side, in particular horizontally or at least substantially horizontally, in particular with an at least predominant horizontal directional component. For this purpose, it is mounted rotatably on a threaded spindle 118. A control geometry 120 having a control contour 122 is likewise arranged on the threaded spindle 118. In particular, the control geometry 120 is rotatable about the threaded spindle 118 together with the protective cover 116. The control contour 122 has a surface that is inclined relative to the horizontal.

With its tip 124, the control projection 23 can follow the control contour 122. This is done by pressing the control projection 23 vertically downward. Owing to the inclination of the control contour 122, the control geometry 120 thereby rotates and thus so does the protective cover 116 via the threaded spindle 118. Thus, the protective cover 116 is pivoted from its initial position shown in FIGS. 2 and 3 to a pivoted position. Thus, the storage space 114 is opened by moving the control projection 23 downward.

The storage location 112 also has an actuating element 126. The actuating element 126 can be in the form of a lever, for example a tilting lever.

By movement of the end effector 20 downward, the actuating projection 25 can press the operating element 126. As a result, a clamping device of the storage space 114 can be opened.

A blocking element 128 can also be seen. The blocking element 128 has a latching mechanism 130. The blocking element 128 also has a blocking pin 129. The blocking element 128 is arranged vertically below the control projection 23.

Figure 4:
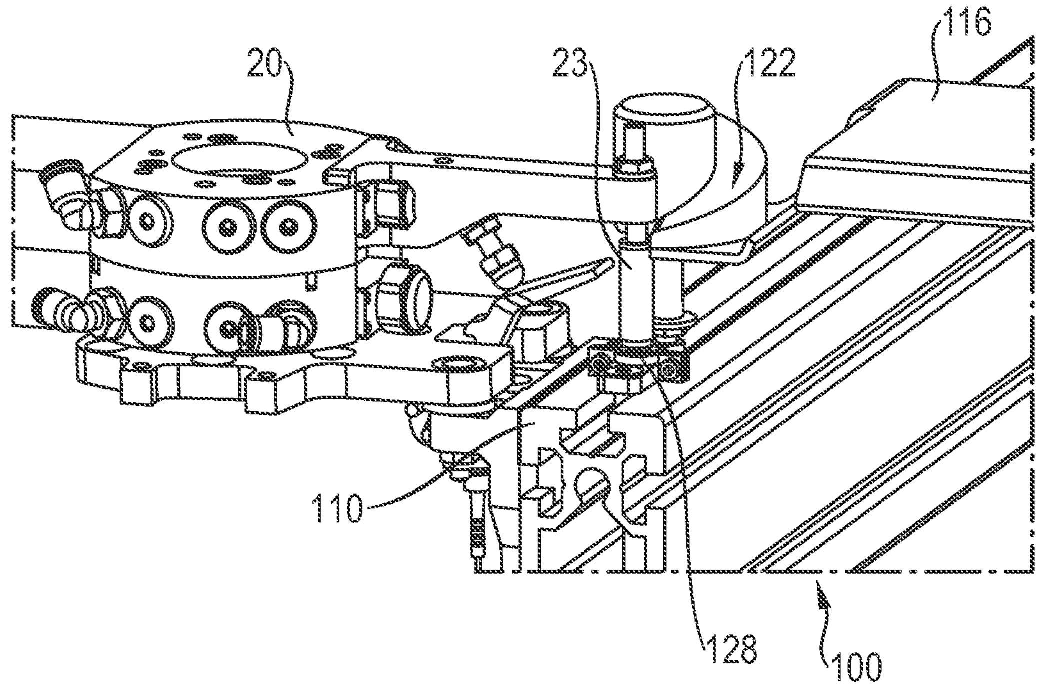
FIGS. 4 and 5 show the storage location according to FIGS. 2 and 3 in other states.

FIG. 4 now shows a state of the storage system 100 and of the end effector 20 corresponding to FIGS. 2 and 3, but in which the end effector 20 is lowered further than its position in FIGS. 2 and 3.

On the way to the position shown in FIG. 4, the control contour 122 has therefore been followed by the control projection 23. The protective cover 116 has been pivoted into the pivoted position.

In the state shown in FIG. 4, the control projection 23 contacts the blocking element 128 for a first time.

Figure 5:
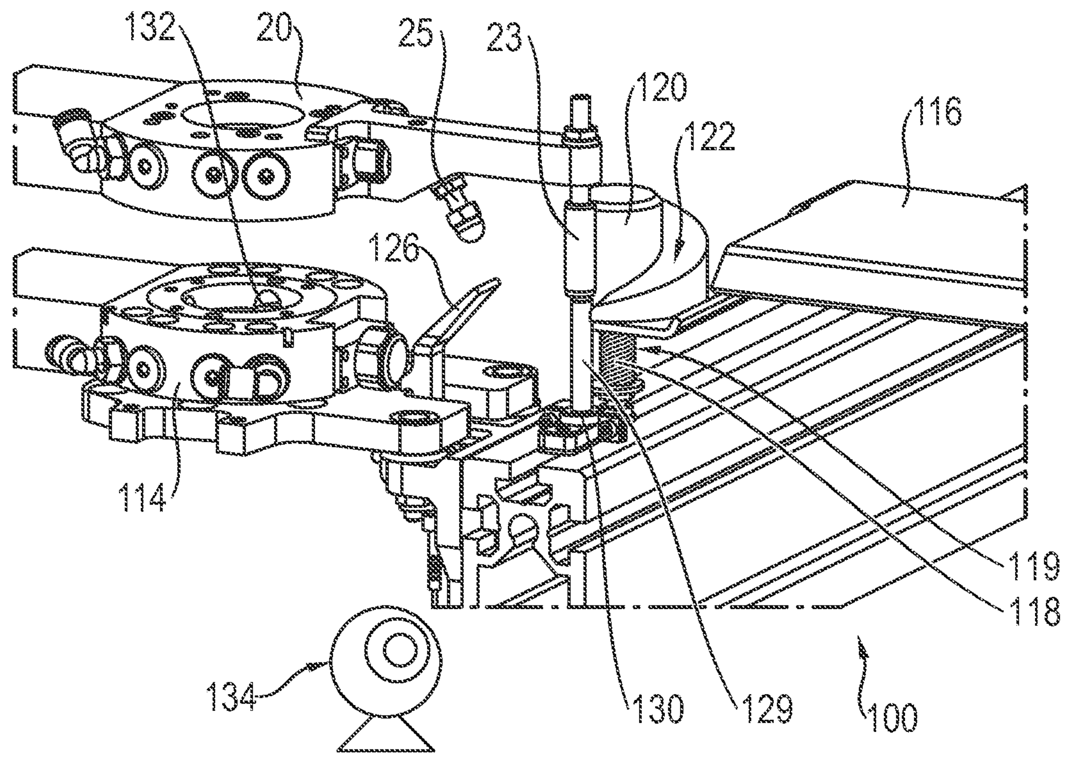

FIG. 5 now shows a state of the storage system 100 and the end effector 20 after the end effector 20 has been moved upward again, starting from the state shown in FIG. 4.

It can be seen that the blocking pin 129 is extended. It reaches as far as the control geometry 120. As a result, the control geometry 120 is blocked in the position shown in FIG. 5. The protective cover 116 is fixed in its pivoted position.

For this purpose, the latching mechanism 130 is set up to release the blocking pin 129 when the control projection 23 makes contact for the first time, for example as illustrated in FIG. 4, and to drive it upward, for example by spring force.

It is also set up such that, after the blocking pin 129 has been pressed downward again, it latches again in its original position, i.e. below the control geometry 120, in particular in the region of the carrier rail 110.

Thus, by pressing the blocking pin 129 for the first time, the latter can be moved upward. The protective cover 116 can be fixed in its pivoted position.

The protective cover 116 can be released again by subsequently pressing the blocking pin 129 downward. The blocking pin 129 can be returned again to its initial position and fixed, in particular latched, there.

A comparison of FIG. 2 or 3 with FIG. 4 or 5 shows that the protective cover 116 has been raised together with the control geometry 120 by pivoting the protective cover 116 from the initial position into the pivoted position. For this purpose, the threaded spindle 118 has a thread 119. The thread 119 can have a pitch which corresponds to the inclination of the control contour 122 or is steeper than this.

Thus, after release, the protective cover 116 can pivot back again into its initial position automatically, in particular driven by gravity. In particular, it can thus automatically cover the storage space 114 again and thus protect it.

As is apparent for example from FIG. 5, the storage space 114 has a clamping device 132. The clamping device 132 can be opened by actuation of the actuating element 126 and can be closed by release of the actuating element 126. As a result, for example, an object (not illustrated in FIG. 5) held in the clamping device 132 can be released and picked up by the end effector 20, for example.

The actuating element 126 is actuated precisely when the end effector 20 reaches a predetermined desired position. In the example according to FIGS. 4 and 5, said desired position corresponds to the end effector 20 resting on the storage space 114. This can be achieved, for example, by suitably adjusting the length of the actuating projection 25.

If the end effector 20 is moved upward again such that it reaches a position as depicted in FIG. 5, for example, the actuating pin 25 moves away from the actuating element 126.

The actuating element 126 can return to its starting position, for example the position illustrated in FIGS. 4 and 5, for example by spring force. The clamping device 132 can thus be returned to an original state, for example a closed state.

It is conceivable, for example for quality assurance during use of the storage system 100, to arrange a monitoring sensor 134 on the storage system 100 and/or on the end effector 20.

The monitoring sensor 134 can have an image recording unit, for example. An image recorded by the monitoring sensor 134, in particular by the image recording unit, can then be evaluated by image processing using a computer or the like. For example, it can be determined in which position, in particular the initial position or the pivoted position, the protective cover 116 is located. It can also be determined whether, for example, the blocking pin 129 is retracted or extended. It is also conceivable for it to be determined whether the actuating element 126 is or is not actuated. Alternatively or additionally, the monitoring sensor 134 can also have an electromechanical sensor, for example for detecting a position of the protective cover 116.

A detected state, for example a detected position of an element, can then be compared with an expected state, for example an expected position of the respective element.

If a deviation is detected, an error signal, for example, can be triggered. It is also conceivable that, in such an error case, a picking up and/or depositing process for picking up or depositing the object is interrupted or aborted.

LIST OF REFERENCE SIGNS

10 Construction robot
12 Undercarriage
14 Housing
16 Control space
18 Manipulator
20 End effector
22 Power drill
23 Control projection
24 Dust extraction device
25 Actuating projection
26 Computer unit
28 Memory unit
100 Storage system
110 Carrier rail
112 Storage location
114 Storage space
116 Protective cover
118 Threaded spindle
119 Thread
120 Control geometry
122 Control contour
124 Tip
126 Actuating element
128 Blocking element
129 Blocking pin
130 Latching mechanism
132 Clamping device
134 Monitoring sensor
III Detail

The invention claimed is:

1. A storage system having at least one storage location wherein the at least one storage location has a protective cover and a storage space, wherein the protective cover is arranged pivotably at the storage location, the storage location having a control contour such that, by following the control contour, the protective cover is pivotable and/or is pivoted from an initial position into a pivoted position, wherein the protective cover and the control contour are rotatably mounted on a common threaded spindle which has a thread.

2. The storage system as claimed in claim 1, wherein the storage location has a blocking element which is set up to fix the protective cover at least in the pivoted position.

3. The storage system as claimed in claim 1, wherein the blocking element has a latching mechanism such that the blocking element is releasably securable in an active state, in which the blocking element can fix the protective cover in the pivoted position, and/or in an inactive state, in which the protective cover is pivotable.

4. The storage system as claimed in claim 1, wherein the protective cover is higher in the pivoted position than in the initial position.

5. The storage system as claimed in claim 1, wherein the control contour has a pitch which is greater than or equal to a pitch of the thread of the common threaded spindle.

6. The storage system as claimed in claim 1, wherein the storage location has an actuating element which is set up to activate and/or deactivate a clamping device of the storage space when actuated.

7. The storage system as claimed in claim 1, wherein the storage space is configured to receive a consumable, a tool for an electric power tool and/or an electric power tool.

8. A construction robot having a manipulator and having a storage system as claimed in claim 1.

9. The construction robot as claimed in claim 8, wherein a control projection is formed on an end effector of the manipulator and is set up to follow a control contour of a storage location of the storage system.

10. The construction robot as claimed in claim 8, for carrying out construction work on a structural and/or civil engineering construction site.

11. The storage system of claim 1, wherein protective cover is for protection against entering and/or escaping particles, liquids and/or gases.

12. The storage system as claimed in claim 7, wherein the tool for an electric power tool and/or an electric power tool is a power drill or a dust extraction device.

* * * * *